(12) United States Patent
Okada et al.

(10) Patent No.: US 8,284,688 B2
(45) Date of Patent: Oct. 9, 2012

(54) PACKET CAPTURE APPARATUS, PACKET CAPTURE METHOD, AND COMPUTER READABLE MEDIUM HAVING A PACKET CAPTURE PROGRAM

(75) Inventors: Sumiyo Okada, Kawasaki (JP);
Noriyuki Fukuyama, Kawasaki (JP);
Masanobu Morinaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/493,840

(22) Filed: Jun. 29, 2009

(65) Prior Publication Data

US 2010/0020708 A1    Jan. 28, 2010

(30) Foreign Application Priority Data

Jul. 28, 2008   (JP) ................... 2008-192964

(51) Int. Cl.
*H04J 3/14* (2006.01)
(52) U.S. Cl. ........................ 370/252; 709/224
(58) Field of Classification Search .............. 370/252, 370/253; 709/224
See application file for complete search history.

(56) References Cited

U.S. PATENT DOCUMENTS

| | | | |
|---|---|---|---|
| 7,369,509 B2 * | 5/2008 | Lapeyre et al. | 370/252 |
| 7,532,581 B1 * | 5/2009 | Metzger et al. | 370/252 |
| 7,567,521 B2 * | 7/2009 | Olgaard et al. | 370/252 |
| 7,783,740 B2 * | 8/2010 | Siorek et al. | 709/224 |
| 7,936,694 B2 * | 5/2011 | Choudhury | 370/252 |
| 2003/0195958 A1 * | 10/2003 | Byron et al. | 709/224 |
| 2004/0034703 A1 * | 2/2004 | Phadke | 709/224 |
| 2006/0007870 A1 * | 1/2006 | Roskowski et al. | 370/252 |
| 2009/0003228 A1 * | 1/2009 | Chen et al. | 370/252 |
| 2009/0182953 A1 * | 7/2009 | Merkey et al. | 709/224 |

FOREIGN PATENT DOCUMENTS

| | | |
|---|---|---|
| JP | 2001-103090 | 4/2001 |
| JP | 2004-088289 | 3/2004 |
| JP | 2005-159807 | 6/2005 |
| JP | 2007-249348 | 9/2007 |

* cited by examiner

*Primary Examiner* — Jeffrey M Rutkowski
(74) *Attorney, Agent, or Firm* — Staas & Halsey LLP

(57) ABSTRACT

A packet capture apparatus and method including receiving packets through a network, acquiring target packets including specific information from the received packets, extracting the target packets of each session, and storing the extracted target packets, estimating a capture cycle, a capture width, and a capture start time based on static information about the target packets to determine a start time and an end time of the reception of the packets based on the capture cycle, the capture width, and the capture start time, setting the start time and the end time in control by the packet capturing part, and using the start time and the end time being set to control intermittent packet capturing, where the packets are received during each capture width every capture cycle from the capture start time.

8 Claims, 13 Drawing Sheets

ESTIMATED CAPTURE PERIOD

ACTUAL CAPTURE PERIOD

ESTIMATED CAPTURE PERIOD

ACTUAL CAPTURE PERIOD

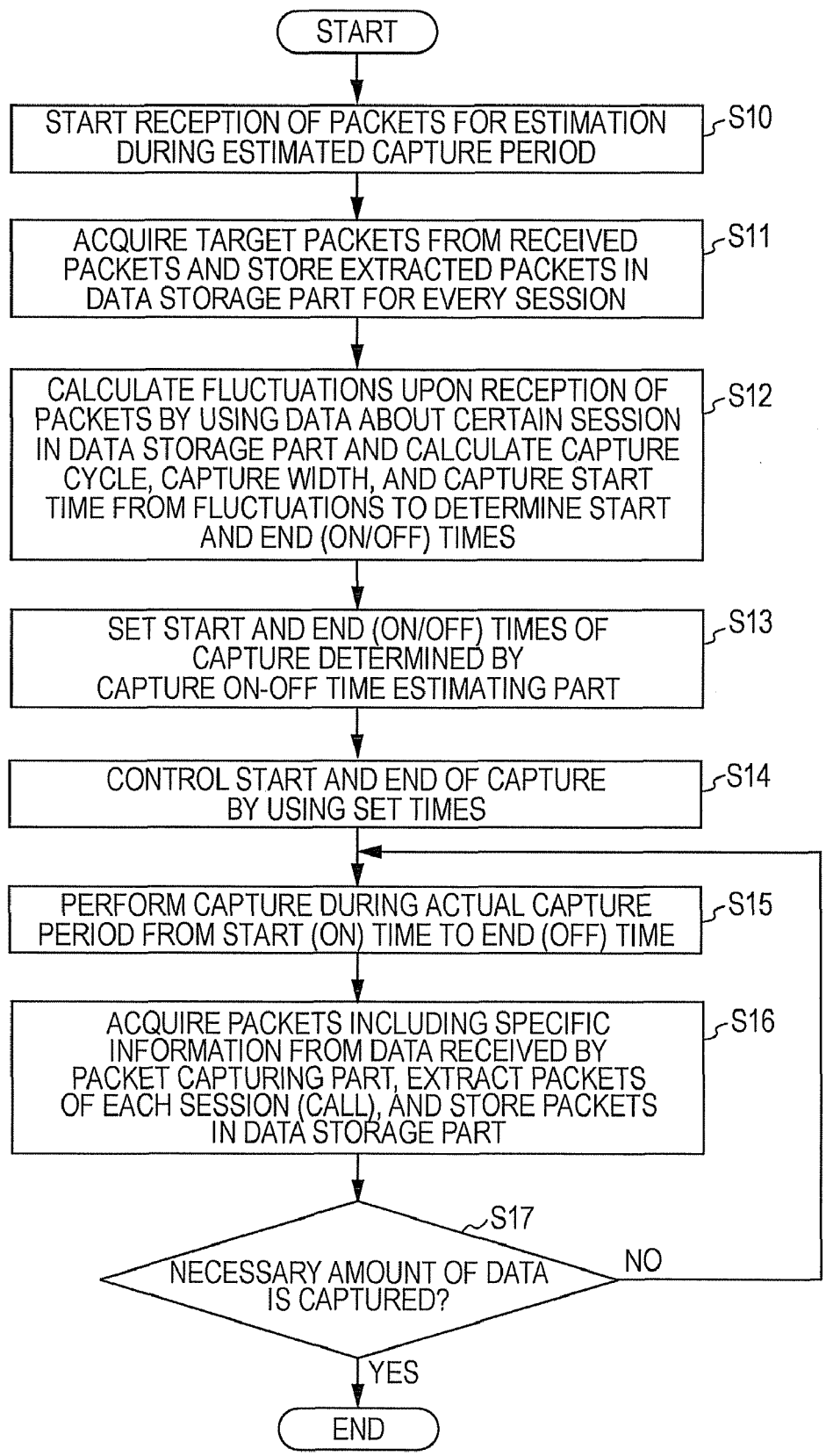

PACKET CAPTURE APPARATUS, PACKET CAPTURE METHOD, AND COMPUTER READABLE MEDIUM HAVING A PACKET CAPTURE PROGRAM

CROSS-REFERENCE TO RELATED APPLICATIONS

This application is based upon and claims the benefit of priority of the prior Japanese Patent Application No. 2008-192964, filed on Jul. 28, 2008, the entire contents of which are incorporated herein by reference.

BACKGROUND

1. Field

The present invention relates to capturing (acquiring) packet(s) flowing through a packet communication network in order to measure communication quality of the packet communication network on the basis of the packet(s).

2. Description of the Related Art

Communication systems, such as Internet Protocol (IP) telephones, over packet communication networks are in widespread use in part owing to the prevalence of, for example, Voice over Internet Protocol (VoIP) technology. In order to manage the communication quality in a packet communication network using the VoIP or the like, technologies for measuring a communication quality value, such as a loss rate of packets flowing through the packet communication network, and comparing the measured communication quality value with a management reference value that is set by a network manager in advance to detect the communication state in order to monitor the packet communication network are proposed (for example, refer to Japanese Laid-open Patent Publication No. 2005-159807 and Japanese Laid-open Patent Publication No. 2004-88289).

SUMMARY

Accordingly, it is an object of in one aspect of an embodiment to provide a packet capture apparatus, a packet capture method, and a computer readable recording medium having a packet capture program that includes an inexpensive functional part and that is capable of efficient packet capture.

According to an aspect of the invention, a packet capture apparatus includes a packet capturing part receiving packets through a packet communication network, a data extracting-storing part acquiring target packets including specific information from the received packets, extracting the target packets of each session, and storing the extracted target packets in a data storage part. According to an aspect, a packet capture apparatus includes a capture on-off time estimating part estimating a capture cycle, a capture width, and a capture start time based on static information about the target packets to determine a start time and an end time of the reception of the packets based on the capture cycle, the capture width, and the capture start time, where the capture cycle is a time period during which the reception of the packets by the packet capturing part is performed, the capture width is a time period during which the reception of the packets is continued, the capture start time is a time when the reception of the packets is started.

According to an embodiment, a packet capture apparatus includes a capture on-off time setting part setting the start time and the end time in control by the packet capturing part, and a capture on-off controlling part performing the control with the start time and the end time being set to control intermittent packet reception by the packet capturing part, where the packet capturing part receives the packets during each capture width every capture cycle from the capture start time in accordance with the control by the capture on-off controlling part.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 13 is an example flowchart of a packet capture process using dynamic information.

DETAILED DESCRIPTION OF EMBODIMENTS

Figure 1:
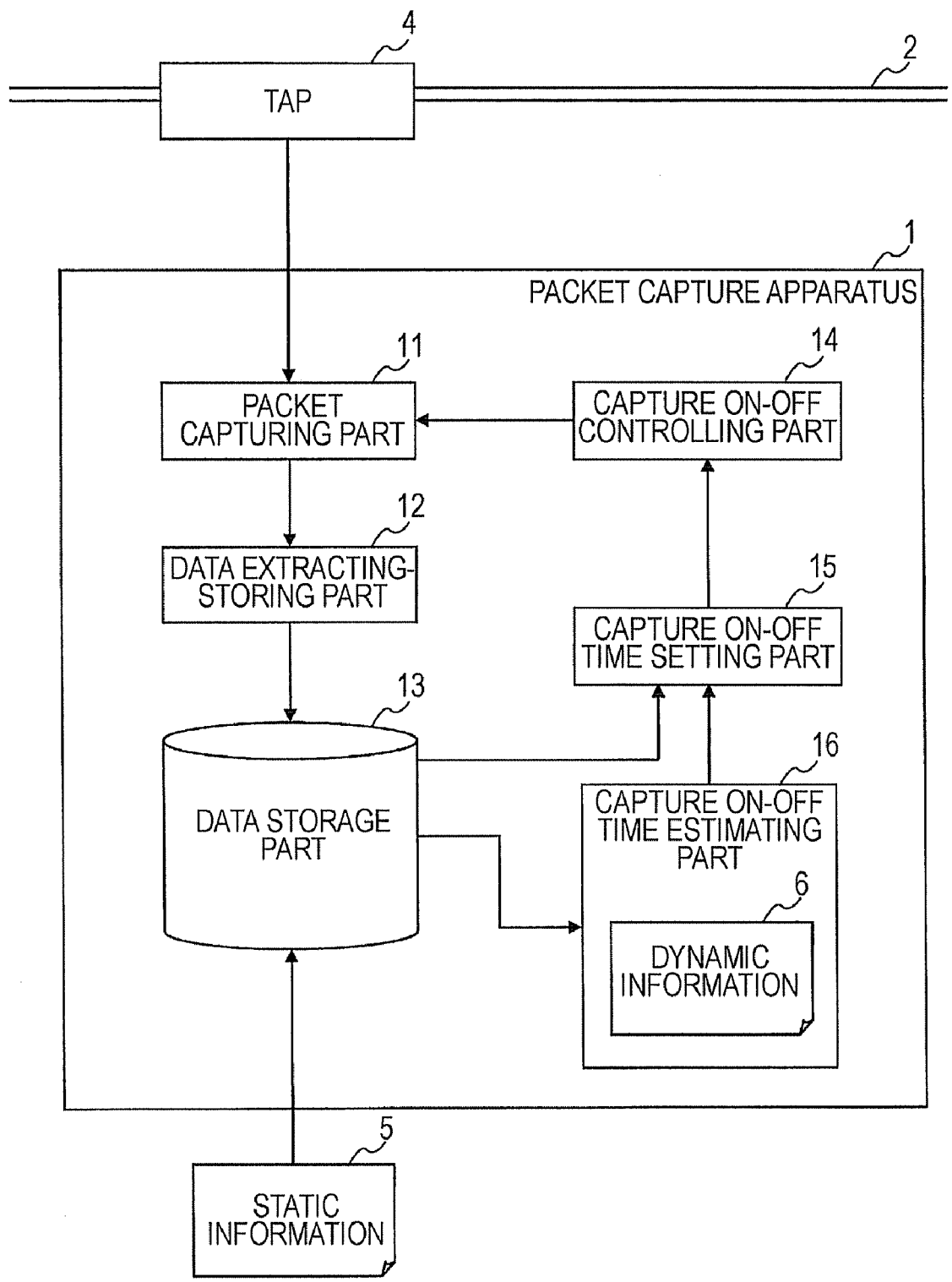
FIG. 1 is an example block diagram of a configuration of a packet capture apparatus.

Reference will now be made in detail to the embodiments, examples of which are illustrated in the accompanying drawings, wherein like reference numerals refer to the like elements throughout. The embodiments are described below to explain the present invention by referring to the figures.

Technologies in related art have a problem in that they are not realized by configurations including inexpensive functional parts. Specifically, in the related art, all the packets flowing through a network are received to determine whether each of the packets includes specific information (for example, audio information).

Alternatively, all the received packets are stored and it is determined whether each packet is associated with any event in order to extract packets necessary for each event and process the extracted packets.

Accordingly, it is necessary to provide an expensive processing part that is capable of capturing (acquiring) all the packets and that is capable of determining whether each packet includes specific information (for example, audio information) and whether each packet is associated with any event.

In addition, since all the packets that are determined to include specific information (for example, audio information) are stored in a storage part in the related art, it is necessary to provide the expensive high-capacity storage part capable of storing a large number of packets (for example, audio packets).

In order to resolve the above and other problems, it is an object of on aspect of the embodiments to provide a packet capture apparatus, a packet capture method, and a computer-readable recording medium having a packet capture program that includes an inexpensive functional part and that is capable of efficient packet capture.

FIG. 1 is an example block diagram of the configuration of a packet capture apparatus 1.

The packet capture apparatus 1 includes a packet capturing part 11, a data extracting-storing part 12, a data storage part 13, a capture on-off controlling part 14, a capture on-off time setting part 15, and a capture on-off time estimating part 16.

The packet capturing part 11 receives packets flowing through a packet communication network 2 through a network tap (TAP) 4.

The data extracting-storing part 12 acquires packets (target packets) including specific information from the packets received by the packet capturing part 11. The data extracting-storing part 12 extracts the target packets of each terminal (session) with which the acquired target packets are exchanged and stores the target packets in the data storage part 13.

Specifically, when the target packets are audio packets, the data extracting-storing part 12 acquires Real-time Transfer Protocol (RTP) packets from the packets received by the packet capturing part 11 to extract the packets of each session (call).

The capture on-off controlling part 14 controls start and end of the capture operation of the packet capturing part 11 which enables implementation of intermittent capture (selective, on-demand, etc.) in the packet capturing part 11. The packet capture apparatus 1, thus, enables a parameter to be set using which capturing of packets is implemented or configured.

The capture on-off time setting part 15 sets a start time and an end time of the capture by the capture on-off controlling part 14.

The capture on-off time estimating part 16 estimates and determines a capture cycle, a capture width, and a capture start time on the basis of static information 5 or dynamic information 6 concerning the target packets.

The capture cycle refers to a time period from the start of a capture to the start of the next capture. The capture width refers to a time period during which the capture is continuously performed and corresponds to the time period from the start of the capture to the end thereof. The capture start time refers to a time when the first capture is started in the intermittent capture control.

The static information 5 corresponds to the target packets including specific information. The static information 5 is externally input into the packet capture apparatus 1 before the capture of the target packets and is stored in the data storage part 13 in the packet capture apparatus 1.

The dynamic information 6 is dynamically acquired by the capture on-off time estimating part 16 by using the target packets that are acquired from the packets received by the packet capturing part 11 during an estimated capture period.

Figure 2:
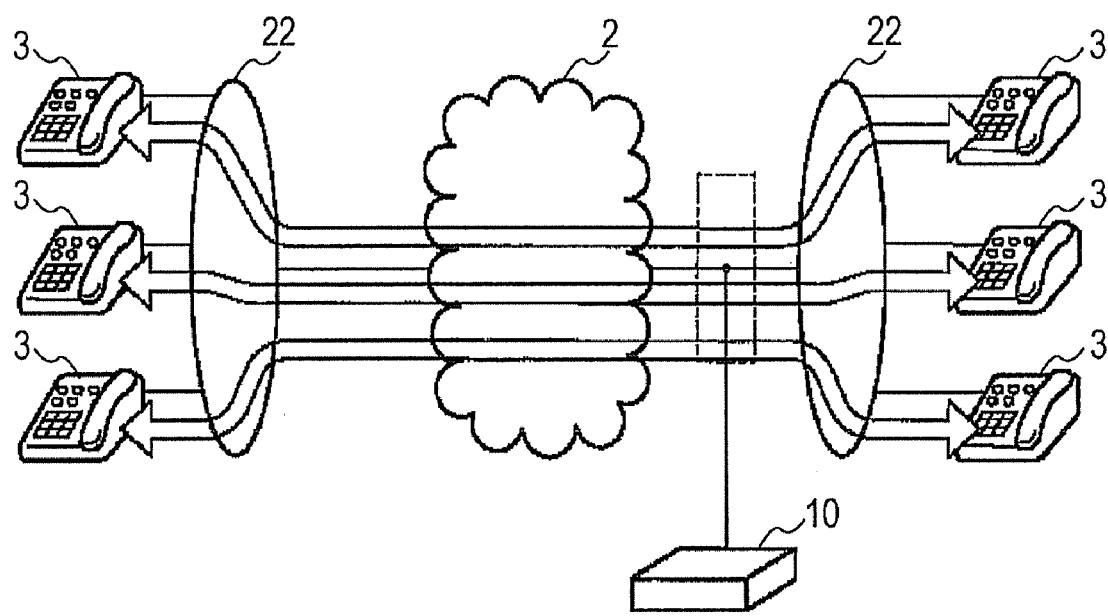
FIG. 2 is an example of a configuration in which a packet capture apparatus is provided to a communication-quality measuring apparatus and quality of an IP telephone service is measured.

FIG. 2 is an example of a configuration in which the packet capture apparatus 1 is provided to a communication-quality measuring apparatus 10 and quality of an IP telephone service is measured with the communication-quality measuring apparatus 10 connected to a packet communication network 2.

Referring to FIG. 2, the communication-quality measuring apparatus 10 is connected with the packet communication network 2 providing the IP telephone service via, for example, a router and a switching hub (not shown). Each telephone set 3 having the IP telephone function is connected to a network 22 to which the telephone set 3 belongs via, for example, a router and a switching hub (not shown).

Arrows in FIG. 2 represent a flow of packets carrying audio data. Call connection between the telephone sets 3 is established by a Session Initiation Protocol (SIP) server (not shown). The packets carrying the audio data are transmitted and received between the telephone sets 3 in an RTP session established by the SIP server to realize the IP telephone service.

The packet capture apparatus 1 included in the communication-quality measuring apparatus 10 captures the packets transmitted and received between the telephone sets 3 in the RTP session.

The communication-quality measuring apparatus 10 reads out IP headers of the packets captured by the packet capture apparatus 1 and analyzes the readout IP headers to acquire a source IP address and a destination IP address. In addition, the communication-quality measuring apparatus 10 reads out User Datagram Protocol (UDP) headers and analyzes the readout UDP headers to acquire a source port number and a destination port number in order to identify a session. Furthermore, the communication-quality measuring apparatus 10 reads out RTP headers and analyzes the readout RTP headers to acquire sequence numbers in order to determine the presence of a lost packet and to extract and store a continuous call.

According to an embodiment, the packet capture apparatus 1 performs intermittent packet capture on the basis of the static information 5 defined for each target packet including specific information.

Figure 3:
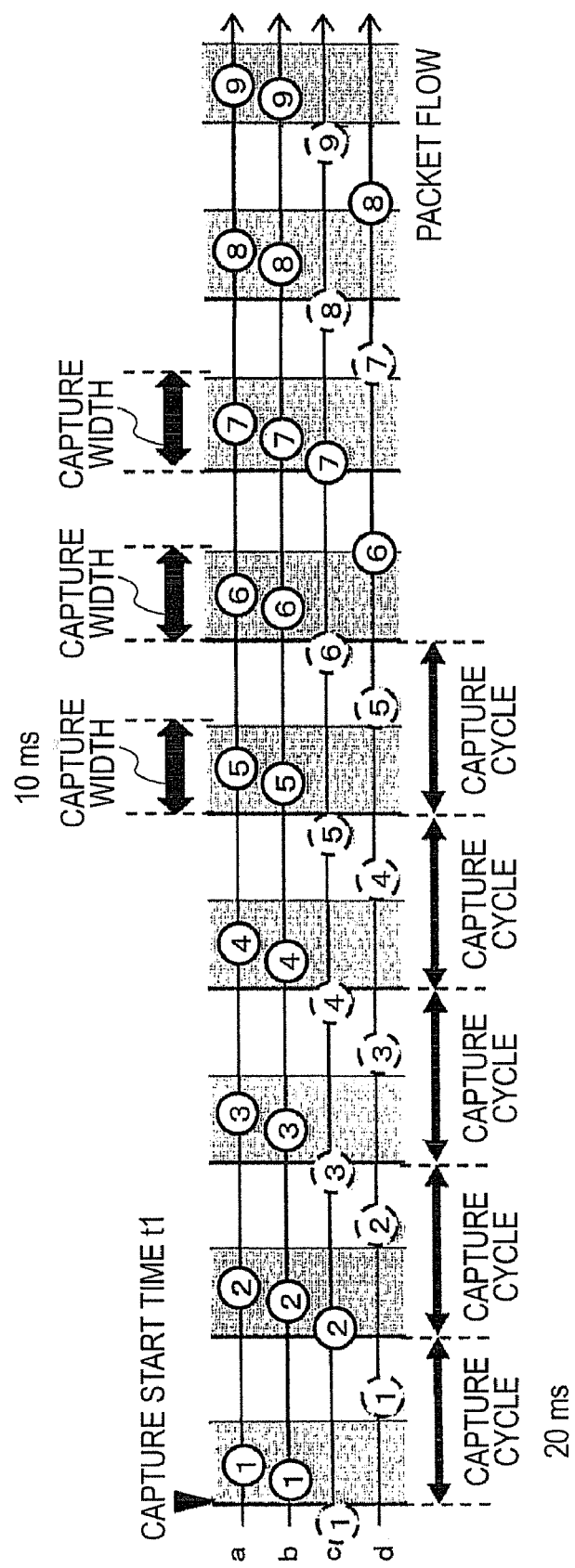
FIG. 3 illustrates a packet capture process when target packets to be measured are audio packets.
Figure 4:
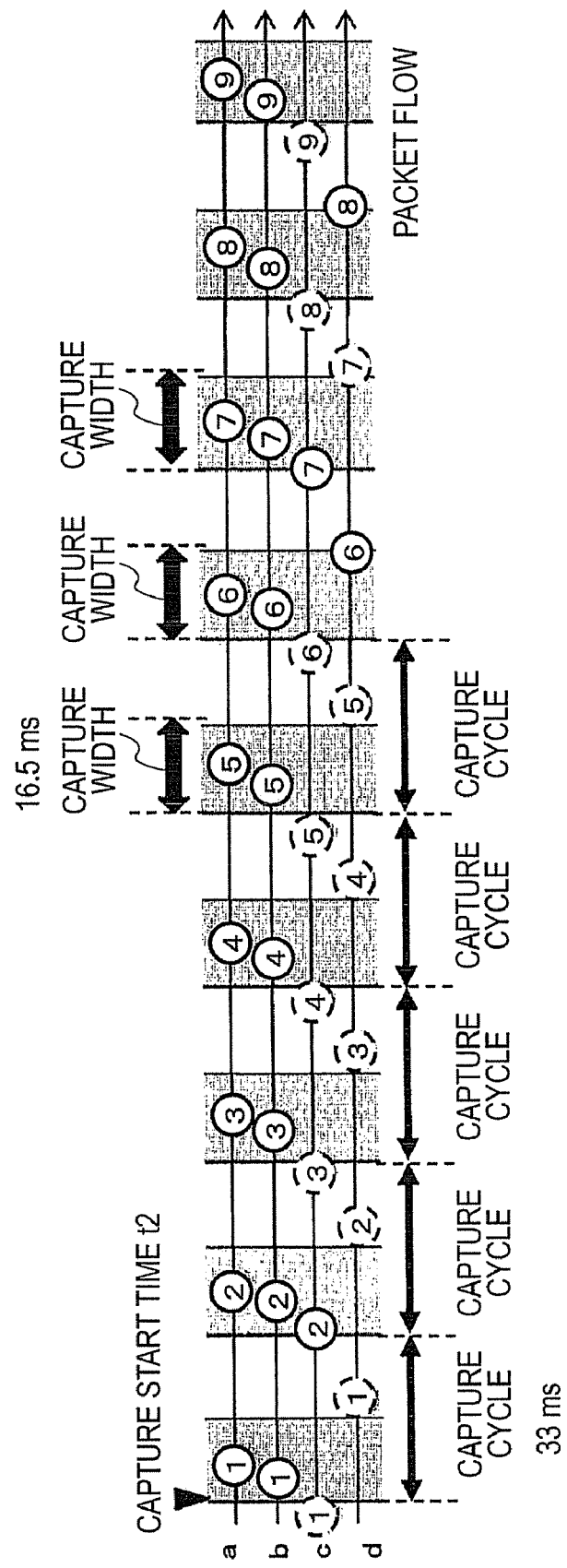
FIG. 4 illustrates a packet capture process when target packets are video packets.
Figure 5:
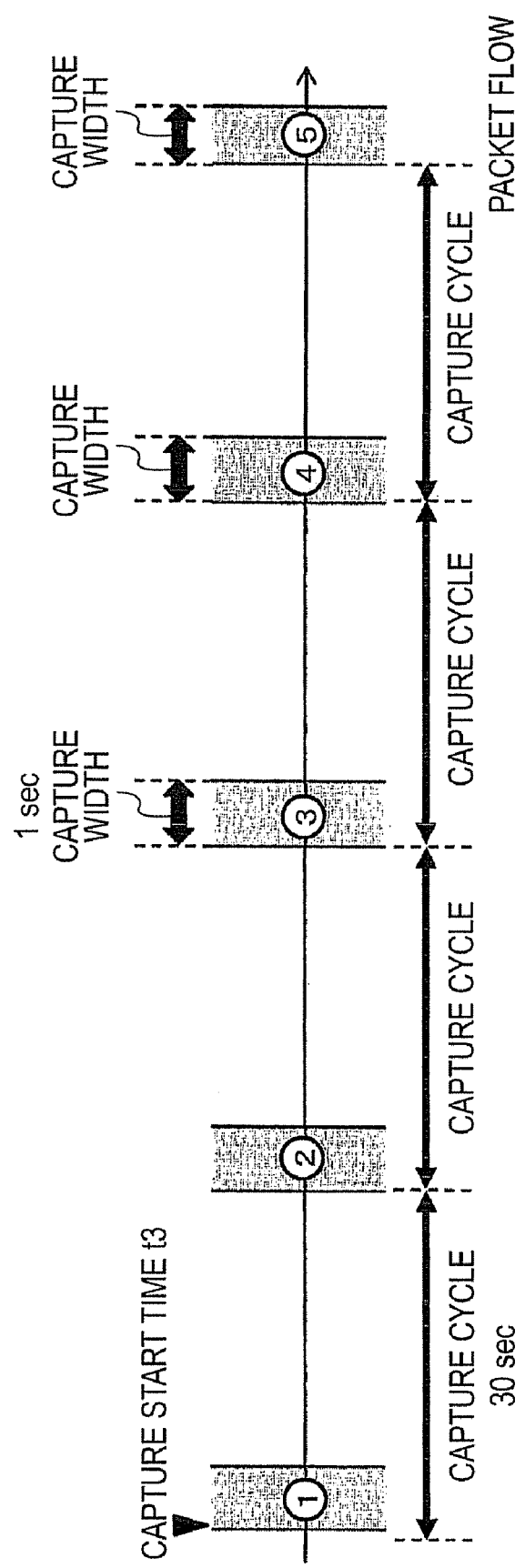
FIG. 5 illustrates a packet capture process when target packets are routing information protocol (RIP) packets.

FIGS. 3 to 5 illustrate packet capture processes.

Referring to FIGS. 3 to 5, packets are represented by circles and orders of the flowing packets are denoted by the figures in the circles. The packets that are captured are represented by solid-line circles and the packets that are not captured are represented by broken-line circles.

FIG. 3 illustrates an intermittent packet capture when target packets including specific information are audio packets.

In the example in FIG. 3, it is assumed that the packets in multiple sessions (calls) a to d flow through the packet communication network 2 (FIG. 1).

When the target packets are audio packets, the static information 5 indicates, for example, a frame time of the audio packets. The static information 5 in which the frame time of the audio packets is set to 20 ms is externally input into the packet capture apparatus 1 and is stored in the data storage part 13 in the packet capture apparatus 1.

The capture on-off time estimating part 16 sets the time period (20 ms) equal to the frame time as the "capture cycle", sets half of the frame time (10 ms) as the "capture width", and sets an arbitrary time t1 as the "capture start time" on the basis of the static information 5 (the frame time of the audio packets=20 ms).

The capture on-off time setting part 15 sets a capture start time (ON time) and a capture end time (OFF time) in the capture control on the basis of the capture start time, the capture cycle, and the capture width determined by the capture on-off time estimating part 16. Specifically, the capture on-off time setting part 15 sets the capture start time t1 as a first start time and sets a time when the capture cycle elapsed since the capture start time t1 as the next start time, and so on. The capture on-off time setting part 15 sets a time when the capture width elapsed since each start time as an end time.

The capture on-off controlling part 14 controls start and end of the packet capture by the packet capturing part 11 on the basis of the start time and the end time set in the capture control. Specifically, the capture on-off controlling part 14 instructs start of the capture at the start time set at the capture start time t1, and the packet capturing part 11 starts to receive packets flowing through the packet communication network 2 through the TAP 4 in response to the start instruction.

The capture on-off controlling part 14 instructs (specifies) end of the capture at the end time when the capture width (10 ms) elapsed since the instruction to start the capture is issued. The packet capturing part 11 ends the reception of the packets in response to the end instruction. Similarly, the capture on-off controlling part 14 instructs start of the next capture at the next start time and instructs end of the capture at the next end time.

The packet capturing part 11 intermittently captures the packets during each capture width (10 ms) every capture cycle (20 ms) from the capture start time t1 in the above capture control.

The capture operation by the packet capturing part 11 is controlled on the basis of the frame time of the audio packets in the static information 5. Accordingly, the audio packets substantially constantly flow during each capture width in some of the multiple sessions (calls), so that the packets can be continuously captured. In the example in FIG. 3, the audio packets can be continuously captured in the sessions (calls) a and b.

FIG. 4 illustrates a packet capture when target packets are video packets.

When the target packets including specific information are video packets, the static information 5 indicates, for example, a frame rate of the video packets.

If the frame rate of the video packets is 30 frames per second (fps) and the video frame is received every 33 ms, the frame rate=30 fps is input as the static information 5.

The capture on-off time estimating part 16 calculates an arrival interval of the video packet from the static information 5 (the frame rate=30 fps) to set the time period (33 ms) equal to the arrival interval as the capture cycle. The capture on-off time estimating part 16 sets half of the capture cycle (16.5 ms) as the capture width and sets an arbitrary time t2 as the capture start time.

The capture on-off time setting part 15 sets a capture ON time and a capture OFF time in the capture control on the basis of the capture start time t2, the capture cycle (33 ms), and the capture width (16.5 ms) determined by the capture on-off time estimating part 16, as in the example shown in FIG. 3.

The capture on-off controlling part 14 controls the packet capture on the basis of the ON time and the OFF time that are set, and the packet capturing part 11 starts the packet capture at the capture start time t2 and intermittently captures the packets during each capture width (16.5 ms) every capture cycle (33 ms). In the example in FIG. 4, the video packets can be continuously captured in the sessions (calls) a and b.

FIG. 5 illustrates a packet capture when the target packets are Routing Information Protocol (RIP) packets.

When the target packets including specific information are RIP packets, the static information 5 indicates, for example, a transmission interval in regular update of the RIP packets (of update messages).

The transmission interval in regular update=30 sec is input as the static information 5 when the target packets are RIP packets.

The capture on-off time estimating part 16 sets the time interval (30 sec) equal to the transmission interval as the capture cycle, sets an arbitrary time interval (for example, one second) as the capture width, and sets an arbitrary time t3 as the capture start time.

As in the example shown in FIG. 3, the capture on-off controlling part 14 controls the packet capture on the basis of the ON time and the OFF time that are set, and the packet capturing part 11 starts the packet capture at the capture start time t3 and performs the intermittent packet capture during each capture width (one second) every capture cycle (30 sec) to continuously acquire the RIP packets.

Figure 6:
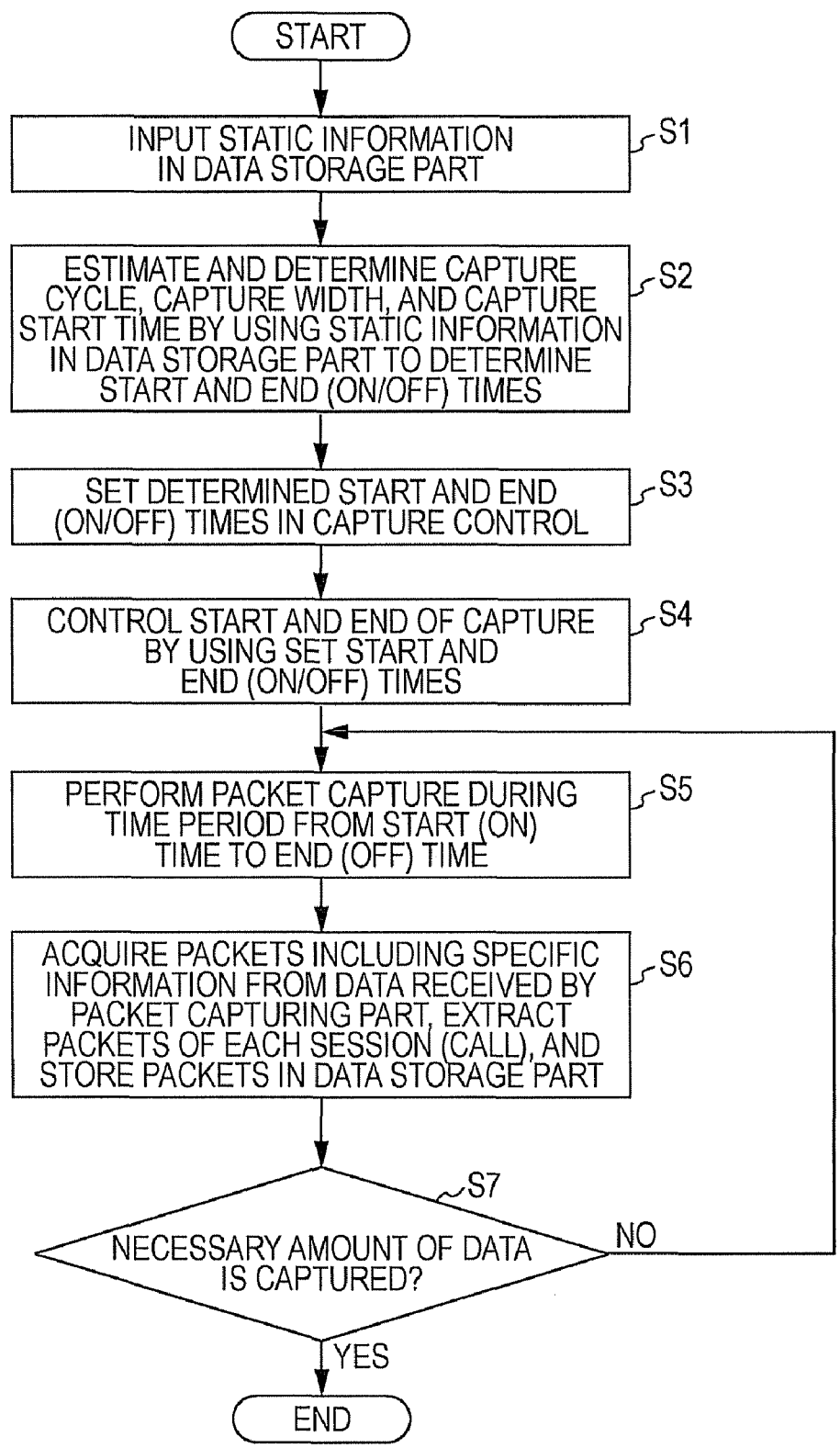
FIG. 6 is an example flowchart of a packet capture process using static information.

FIG. 6 is an example flowchart of a packet capture process using the static information 5.

Referring to FIG. 6, in Operation S1, static information is input into, for example, the data storage part 13 in the packet capture apparatus 1. In Operation S2, the capture on-off time estimating part 16 estimates and determines the capture cycle, the capture width, and the capture start time by using the static information 5 (FIG. 1) in the data storage part 13 to determine a capture start time (ON time) and a capture end time (OFF time).

In Operation S3, the capture on-off time setting part 15, for example, sets the capture start and end times determined by the capture on-off time estimating part 16 in the capture control.

In Operation S4, the capture on-off controlling part 14 controls start (ON) and end (OFF) of the capture by using the capture start and end times set by the capture on-off time setting part 15. In Operation S5, the packet capturing part 11 receives packets during the time period from the time when the capture on-off controlling part 14 instructs start (ON) of the capture to the time when the capture on-off controlling part 14 instructs end (OFF) of the capture.

In Operation S6, the data extracting-storing part 12 acquires packets including specific information from the data received by the packet capturing part 11, extracts the packets of each session (call), and stores the packets in the data storage part 13.

In Operation S7, the data extracting-storing part 12 determines whether a necessary amount of data is captured. If the necessary amount of data is not captured (NO in Operation S7), the process goes back to Operation S5. If the necessary amount of data is captured (YES in Operation S7), the process is terminated. The necessary amount of data is arbitrarily set in advance in accordance with the communication quality that is measured.

According to an embodiment, the packet capture apparatus 1 performs the packet capture on the basis of the dynamic information 6.

Specifically, an "estimated capture period" is set before an "actual capture period" during which the packet capture is actually performed. During the estimated capture period, the dynamic information 6 used for determining parameters used in the capture control during the actual capture period is acquired. The capture on-off time estimating part 16 dynamically acquires information by using the data about the target packets that are stored in the data storage part 13 and that are captured during the estimated capture period to estimate and determine the capture cycle, the capture width, and the capture start time on the basis of the acquired information (the dynamic information 6).

When the target packets are audio packets, the dynamic information 6 indicates, for example, fluctuation information upon reception of the audio packets. When the target packets are video packets, the dynamic information 6 indicates fluctuation information about the video packets. When the target packets are RIP packets, the dynamic information 6 indicates fluctuation information in the regular update of the RIP packets (update message). The fluctuation represents the difference between a time when each packet is to be received and a time when each packet is actually received.

Figure 7:
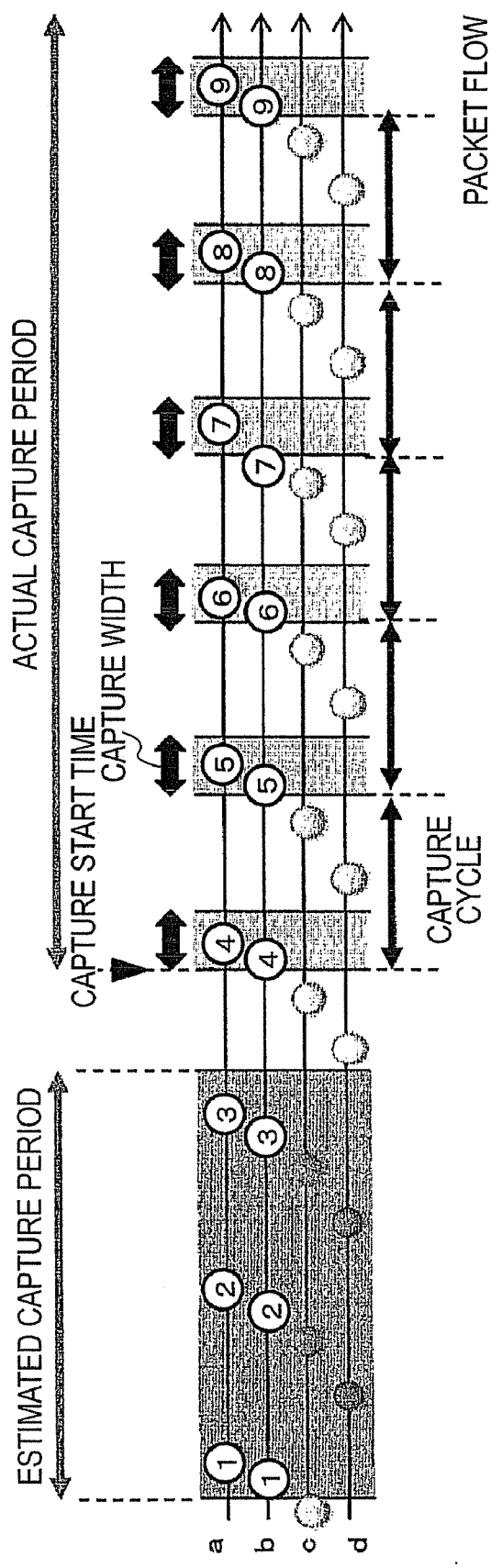
FIG. 7 illustrates an example in which an estimated capture period is used to set a capture cycle, a capture width, and a capture start time.

FIG. 7 illustrates an example in which an estimated capture period is used to set a capture cycle, a capture width, and a capture start time.

Upon reception of packets during a predetermined estimated capture period by the packet capturing part 11, the data extracting-storing part 12 acquires target packets including specific information from the received packets, extracts the target packets of each session, and stores the target packets in the data storage part 13 along with the reception time of each target packet.

The capture on-off time estimating part 16 calculates a fluctuation representing the difference between a time when each packet is actually received and a time when each packet is to be received on the basis of data (for example, RTP packets when the target packets are audio packets) about a certain session, stored in the data storage part 13. Since the clock of a transmission terminal for the packets is shifted from the clock of a reception terminal for the packets (one second of the transmission terminal differs from one second of the reception terminal), the fluctuation is calculated in consideration of the shift in the clock between the transmission terminal and the reception terminal. In the example shown in FIG. 7, the fluctuation upon reception of the packets is calculated by using the data in the session a or b.

Figure 8:
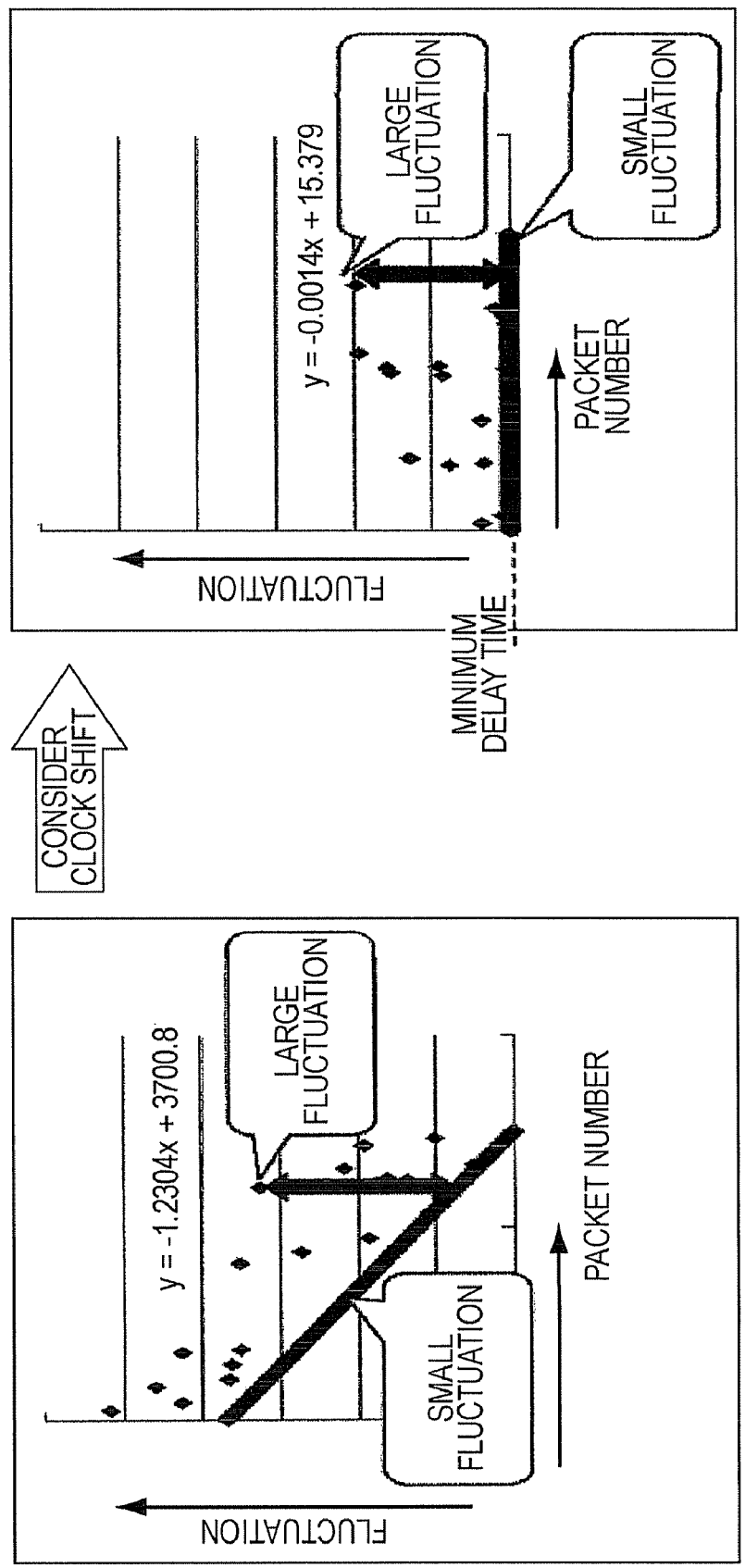
FIG. 8 illustrates an example of distribution of fluctuation (s) upon reception of the target packets.

Specifically, as illustrated in FIG. 8, the capture on-off time estimating part 16 obtains distribution of the fluctuations in reception time of the packets captured during the estimated capture period and compensates the shift in the clock between the transmission terminal and the reception terminal to obtain the fluctuation of each packet.

Figure 9:
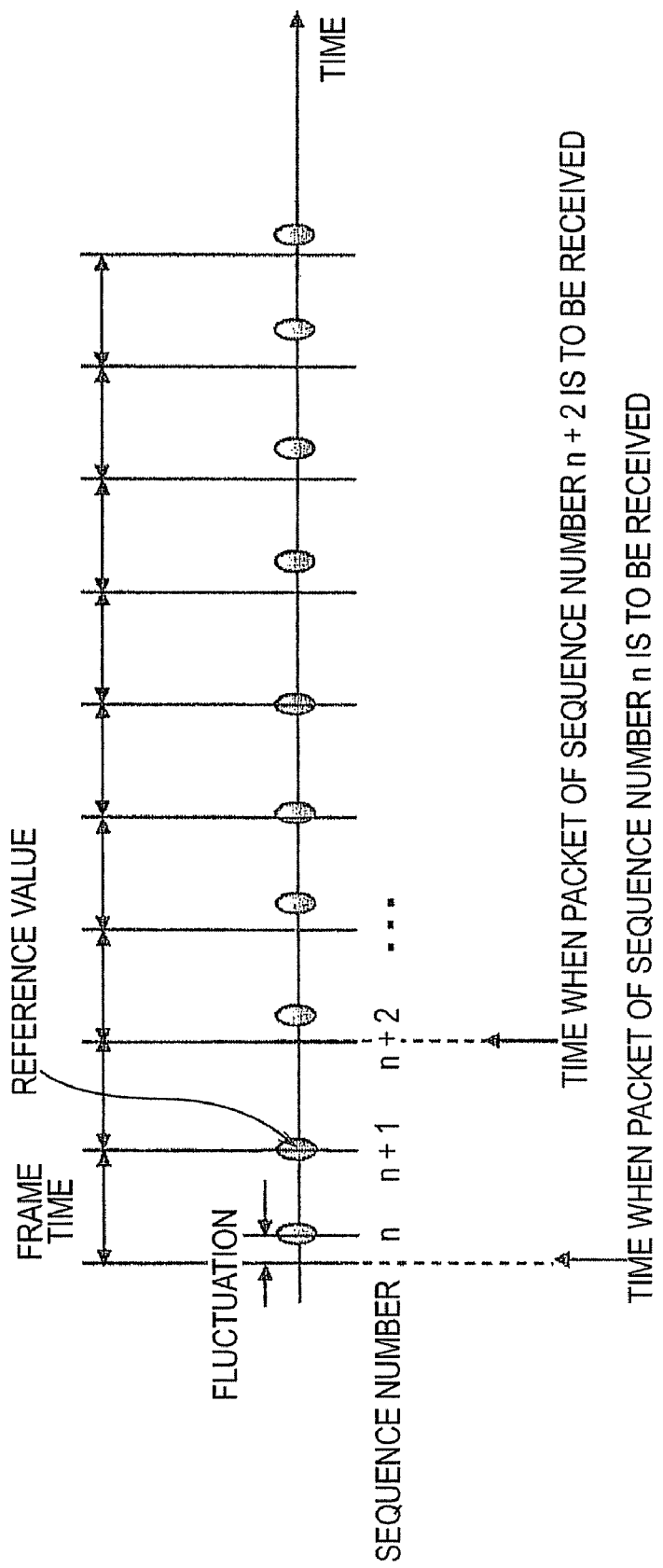
FIG. 9 illustrates an example of how to calculate a reference value.

FIG. 9 illustrates an example of how to calculate a reference value. In the example illustrated in FIG. 9, it is assumed that the minimum difference is found between the time when the audio packet of a sequence number n+1 is actually received and the time when the audio packet is to be received, which is calculated from a unit of data (for example, a frame time) set for every specific information in the audio packet. In this case, the time when the packet of the sequence number n+1, having the minimum fluctuation from the frame time, is received is used as the reference value. The times when the packet of a sequence number n+2 and the subsequent packets are to be received are calculated on the basis of the reference value.

The capture on-off time estimating part 16 calculates the reception interval of the packets from the time when the packet having the minimum fluctuation is received to calculate the capture cycle.

Figure 10A:
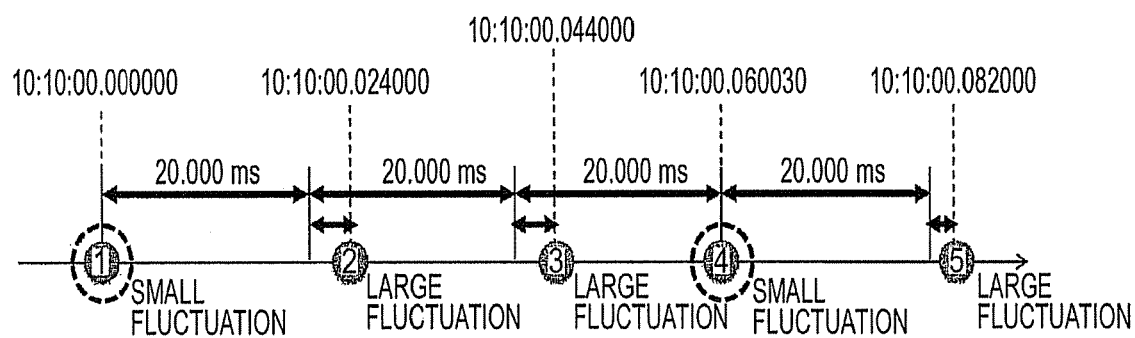
FIGS. 10A and 10B illustrate examples of how to calculate a capture cycle.
Figure 10B:
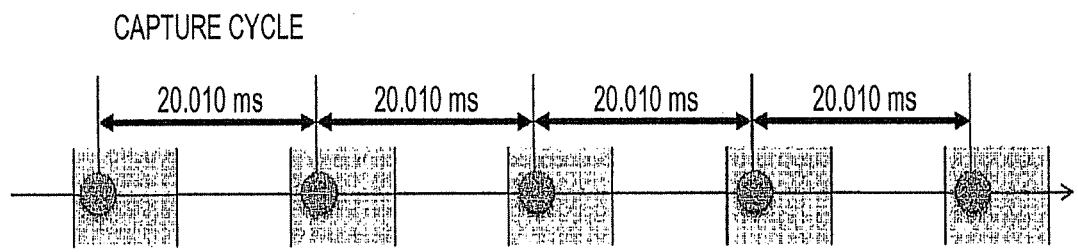

FIGS. 10A and 10B illustrate examples of how to calculate a capture cycle.

As illustrated in FIG. 10A, the capture on-off time estimating part 16 calculates a capture cycle from the target packets received during the estimated capture period by using the reception times of two packets (for example, sequence numbers 1 and 4) having smaller fluctuations that are calculated as follows:

$$\text{Capture cycle} = (10{:}10{:}00.060030 - 10{:}10{:}00.000000) \div (4-1) = 20.010 \text{ ms} \quad \text{Equation 1}$$

As the result of the determination of the capture cycle=20.010 ms by the capture on-off time estimating part 16, the intermittent packet capture is performed on the capture cycle=20.010 ms in the actual capture period during which the packet capture is actually performed, as illustrated in FIG. 10B.

Then, the capture on-off time estimating part 16 calculates the capture width from the distribution of the fluctuations in reception time of the target packets on the basis of a maximum value (Wmax) in all the fluctuations or in the fluctuations of a certain proportion.

Figure 11A:
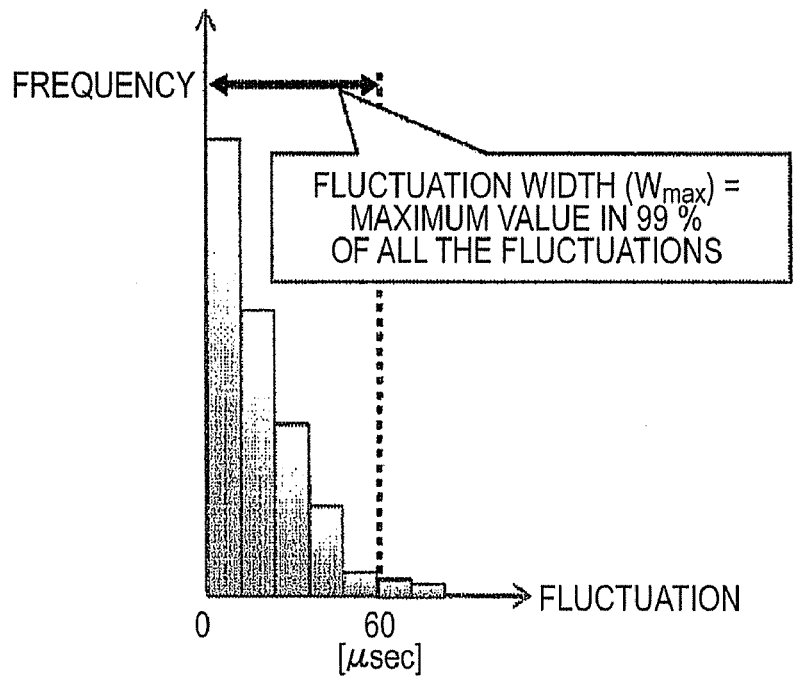
FIGS. 11A and 11B illustrate examples of how to calculate a capture width.
Figure 11B:
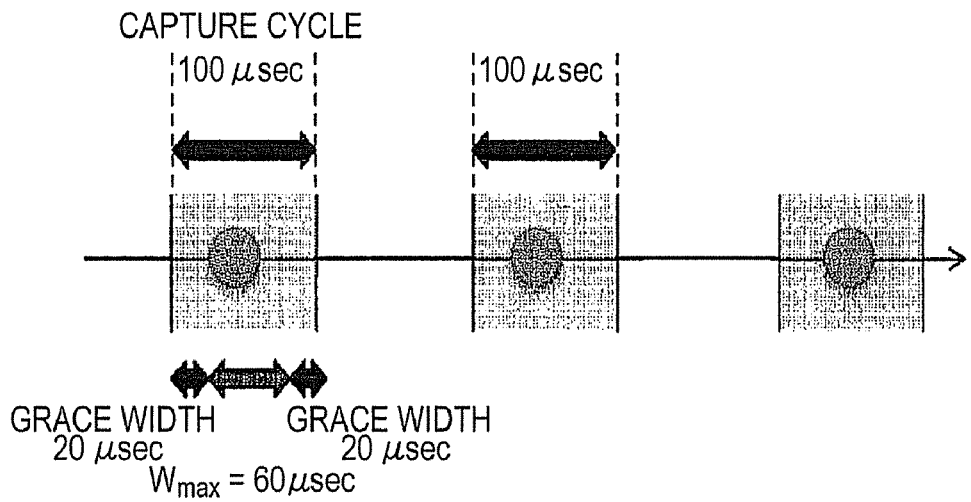

FIGS. 11A and 11B illustrate examples of how to calculate a capture width.

As illustrated in FIG. 11A, the capture on-off time estimating part 16 calculates the frequency of each fluctuation from the fluctuations of the packets captured during the estimated capture period described with reference to FIG. 7 to obtain the maximum value in all the fluctuations or in the fluctuations of a certain proportion. For example, when the maximum value Wmax in 99% of all the fluctuations is 60 μs, the capture width is calculated by adding predetermined grace widths (20 μs) to the maximum value=60 μs as follows:

$$\text{Capture width} = 60 \text{ μs (the maximum value in 99\% of all the fluctuations)} + 20 \text{ μs (grace width)} \times 2 \text{ (both sides)} = 100 \text{ μs} \quad \text{Equation 2}$$

As the result of the determination of the capture width=100 μs by the capture on-off time estimating part 16, the intermittent packet capture is performed during each capture width=100 μs in the actual capture period during which the packet capture is actually performed intermittently, as illustrated in FIG. 11B.

Then, the capture on-off time estimating part 16 calculates the capture start time from a reference packet having the minimum fluctuation, among the target packets captured during the estimated capture period, on the basis of the calculated capture cycle.

Figure 12:
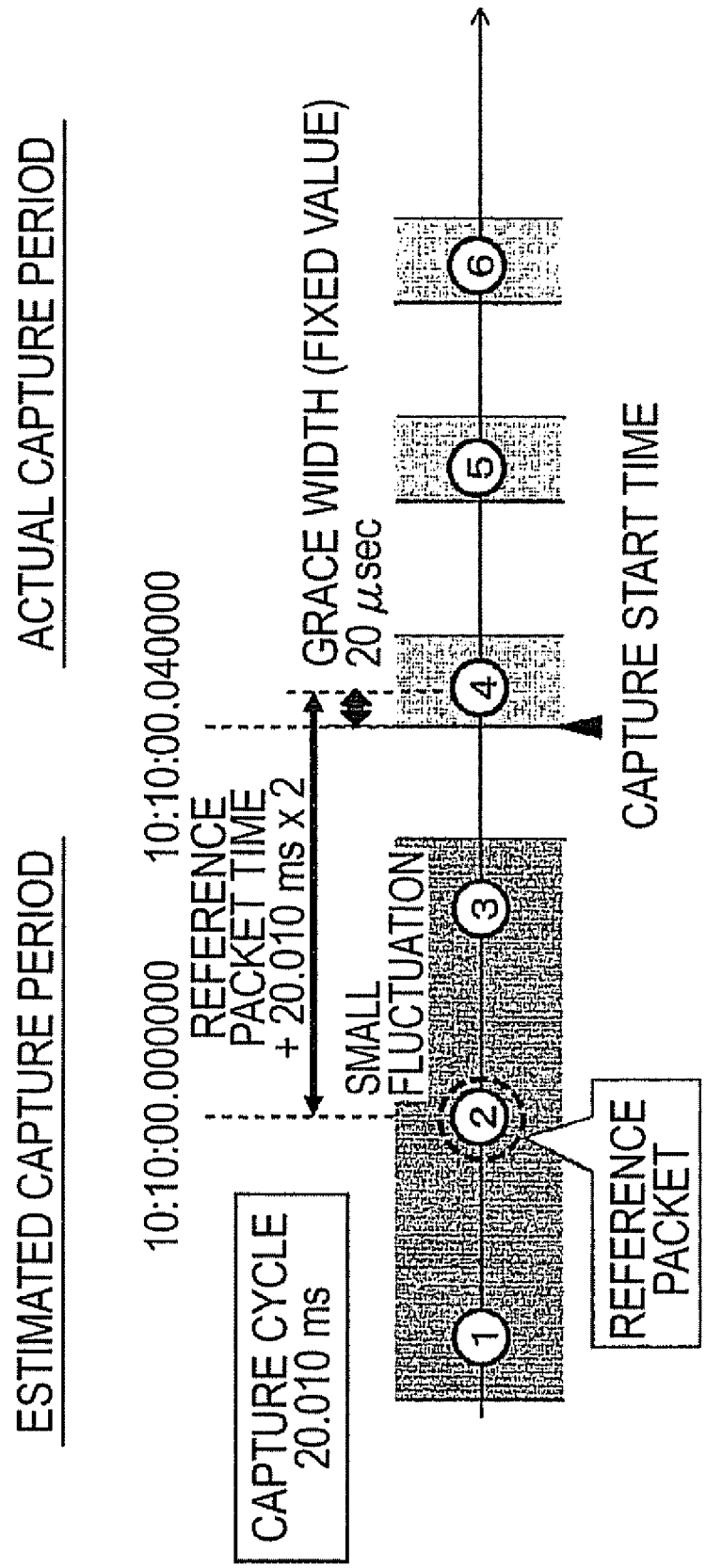
FIG. 12 illustrates an example of how to calculate a capture start time.

FIG. 12 illustrates an example of how to calculate a capture start time.

In the example illustrated in FIG. 12, the capture on-off time estimating part 16 sets a packet having the minimum fluctuation (sequence number 2), among the packets captured during the estimated capture period, as the reference packet. Then, the capture on-off time estimating part 16 calculates the capture star time by using the calculated capture cycle=20.010 ms as follows:

$$\text{Capture start time} = 10{:}10{:}00.000000 \text{ (the time when the reference packet is received)} + 20.010 \text{ ms (capture cycle)} \times (4-2) - 20 \text{ μs (grace width)} = 10{:}10{:}00.040000 \quad \text{Equation 3}$$

As the result of the determination of the capture start time=10:10:00.040000 by the capture on-off time estimating part 16, the intermittent packet capture in the actual capture period is started at a time 10:10:00.040000, as illustrated in FIG. 12.

FIG. 13 is an example flowchart of a packet capture process using the dynamic information 6.

Referring to FIG. 13, in Operation S10, the packet capturing part 11 in the packet capture apparatus 1 starts to receive packets for estimation during a predetermined estimated capture period. In Operation S11, the data extracting-storing part 12 acquires the target packets including specific information from the data received by the packet capturing part 11, extracts the target packets of each session (call), and stores the target packets in the data storage part 13.

In Operation S12, the capture on-off time estimating part 16 calculates fluctuations upon reception of the target packets as the dynamic information 6 by using data about a certain session stored in the data storage part 13 and calculates the capture cycle, the capture width, and the capture start time on the basis of the calculated fluctuations to determine a capture start time (ON time) and a capture end time (OFF time).

In Operation S13, the capture on-off time setting part 15 sets the capture ON and OFF times determined by the capture on-off time estimating part 16 in the capture control.

In Operation S14, the capture on-off controlling part 14 controls start (ON) and end (OFF) of the capture by using the start and end times set in the capture control. In Operation S15, the packet capturing part 11 performs the packet capture during the actual capture period from the time when the capture on-off controlling part 14 instructs start (ON) of the capture to the time when the capture on-off controlling part 14 instructs end (OFF) of the capture.

In Operation S16, the data extracting-storing part 12 acquires packets including specific information from the data received by the packet capturing part 11, extracts the packets of each session (call), and stores the packets in the data storage part 13. In Operation S17, the data extracting-storing part 12 determines whether a necessary amount of data is captured.

If the necessary amount of data is not captured (NO in Operation S17), the process goes back to Operation S15. If the necessary amount of data is captured (YES in Operation S17), the process is terminated.

Although the packet capture apparatus 1 is included in the communication-quality measuring apparatus 10 in the embodiments of the present invention, the packet capture apparatus 1 may be independently configured to perform any of processing(s) in cooperation with the communication-quality measuring apparatus 10.

According to the above embodiments of the present invention, the packet capture apparatus receives the packets during each capture width on the capture cycle from the capture start time to perform the intermittent capture of the target packets including specific information.

The appropriate packet capture is intermittently performed with the operation cycle and the operation period set for the packets including specific information in the above embodiments. Accordingly, it is possible to continuously capture the target packets in a certain session and to reduce the number of captured packets.

In addition, it is possible to estimate the operation cycle and the operation period of the capture from the state of the packets that include specific information and that flow through a network, thereby intermittently performing the more appropriate packet capture. While exemplary components are discussed herein as performing particular operation(s), the present invention is not limited to performing any of the operation(s) via a specific part.

Consequently, it is possible to reduce the load on the apparatus that measures the communication quality of the network by using packets that are captured and to perform the measurement of the communication quality by the apparatus including the inexpensive functional part. This allows both reduction of the cost of the apparatus and improvement of the measurement precision.

A method and system of capturing packets is provided, including selectively setting a parameter for capturing target packets among packets exchanged based on status information of the packets exchanged and controlling capturing of the target packets from each exchange session based on the parameter. Information with respect to setting a parameter may be input prior to or subsequent to a start of capturing of packets.

Any or all of the operations described herein may be implemented via one or more hardware components. However, the present invention is not limited to any specific implementation of an operation. For example, one or more operations discussed herein may be implemented via software executed on a device while others may be executed via a specific hardware device.

The apparatus of the embodiments of the present invention can acquire streaming data, such as audio packets and video packets, and monitoring data, such as routing information, and is applicable to the measurement of the communication quality of the packet communication network for such data.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention, the scope of which is defined in the claims and their equivalents.

What is claimed is:

1. A packet capture apparatus, comprising:
the packet capture apparatus communicating with a computer including:
 a packet capturing part to receive packets through a packet communication network;
 a data extracting-storing part to acquire target packets including specific information from the received packets, extract the target packets of each session, and store the extracted target packets in a data storage part;
 a capture on-off time estimating part to estimate a capture cycle, a capture width, and a capture start time based on information indicating a reception state of the packets received by the packet capturing part and to determine a start time and an end time of reception of the packets based on the capture cycle, the capture width, and the capture start time, the capture cycle being a time period during which the reception of the packets is performed, the capture width being a time period during which the reception of the packets is continued, the capture start time being a time when the reception of the packets is started;
 a capture on-off time setting part to set the start time and the end time; and
 a capture on-off controlling part configured to set intermittent packet reception by the packet capturing part, and
 wherein the packet capturing part receives the packets during a time period from a time when the capture on-off controlling part instructs the capture start time to a time when the capture on-off controlling part instructs the end time of the reception.

2. A packet capture apparatus comprising:
the packet capture apparatus communicating with a computer including:
a packet capturing part to receive packets through a packet communication network;
a data extracting-storing part to acquire target packets including specific information from the received packets, extract the target packets of each session, and store the extracted target packets in a data storage part;
a capture on-off time estimating part estimating a capture cycle, a capture width, and a capture start time based on information about the target packets to determine a start time and an end time of reception of the packets based on the capture cycle, the capture width, and the capture start time, the capture cycle being a time period during which the reception of the packets is performed, the capture width being a time period during which the reception of the packets is continued, the capture start time being a time when the reception of the packets is started;
a capture on-off time setting part to set the start time and the end time; and
a capture on-off controlling part configured to set intermittent packet reception by the packet capturing part, and
wherein the packet capturing part receives the packets during a time period from a time when the capture on-off controlling part instructs the capture start time to a time when the capture on-off controlling part instructs the end time of the reception, and
wherein the packet capturing part receives packets through the packet communication network during a predetermined estimated capture period, and
wherein the data extracting-storing part acquires the target packets from the packets received during the estimated capture period, extracts the target packets of each session, and stores the extracted target packets in the data storage part in according with the reception time of each target packet, and
the capture on-off time estimating part estimates the capture cycle, the capture width, and the capture start time based on information indicating a reception state of the packets received during the estimated capture period.

3. The packet capture apparatus according to claim 2, wherein the capture on-off time estimating part calculates a fluctuation, which represents a difference between a time when each target packet is actually received and a time when the target packet is to be received, from data about the target packets stored in the data storage part after the estimated capture period to use the calculated fluctuation as the information, and
the capture cycle is estimated based on a reception interval of at least two target packets having smaller fluctuations, estimates the capture width based on a maximum value in the fluctuations, and estimates the capture start time based on the time when the target packet having a minimum fluctuation is received.

4. The packet capture apparatus according to claim 2, wherein the information includes a period of protocol data based on the specific information included in the target packets.

5. The packet capture apparatus according to claim 2, wherein the information includes an arbitrary transmission interval of the target packets.

6. A packet capture method performed by a computer including packet capturing part to receive packets from a packet communication network and data storage unit to store the received packets, the packet capture method comprising:
receiving packets through a packet communication network;
acquiring target packets including specific information from the received packets, extracting the target packets of each session, and storing the extracted target packets in the data storage unit;
estimating a capture cycle, a capture width, and a capture start time based on information indicating a reception state of the packets through a packet communication network;
determining a start time and an end time of the reception of the packets based on the capture cycle, the capture width, and the capture start time, the capture cycle being a time period during which the reception of the packets by the packet capturing part is performed, the capture width being a time period during which the reception of the packets is continued, the capture start time being a time when the reception of the packets is started;
setting the start time and the end time;
performing a control with the start time and the end time being set; and
receiving the packets during a time period from a time when an instruction is received regarding the capture start time to a time when an instruction is received regarding the end time of reception.

7. A non-transitory computer-readable storage medium storing a packet capture program causing a computer to execute an operation, the operation comprising:
receiving packets through a packet communication network;
acquiring target packets including specific information from the received packets, extracting the target packets of each session, and storing the extracted target packets in a data storage part;
estimating a capture cycle, a capture width, and a capture start time based on information indicating a reception state of the packets received by the packet capturing part and to determine a start time and an end time of the reception of the packets based on the capture cycle, the capture width, and the capture start time, the capture cycle being a time period during which the reception of the packets is performed, the capture width being a time period during which the reception of the packets is continued, the capture start time being a time when the reception of the packets is started;
setting the start time and the end time in control of the reception of the packets;
using the start time and the end time being set to control intermittent packet reception; and
receiving the packets during a time period from a time when an instruction is received regarding the capture start time to a time when an instruction is received regarding the end time.

8. A computer implemented method, comprising:
selectively setting a parameter for capturing target packets among packets exchanged based on information indicating a reception state of the packets exchanged; and
controlling capturing of the target packets from each exchange session based on the parameter responsive to an instruction received subsequent to the setting of the parameter.

* * * * *

UNITED STATES PATENT AND TRADEMARK OFFICE
CERTIFICATE OF CORRECTION

| | | |
|---|---|---|
| PATENT NO. | : 8,284,688 B2 | Page 1 of 1 |
| APPLICATION NO. | : 12/493840 | |
| DATED | : October 9, 2012 | |
| INVENTOR(S) | : Sumiyo Okada et al. | |

It is certified that error appears in the above-identified patent and that said Letters Patent is hereby corrected as shown below:

In the Claims:

Column 12, Lines 57-64, Cancel Claim 8.

Signed and Sealed this
Twenty-fifth Day of December, 2012

David J. Kappos
*Director of the United States Patent and Trademark Office*